Figure 1:
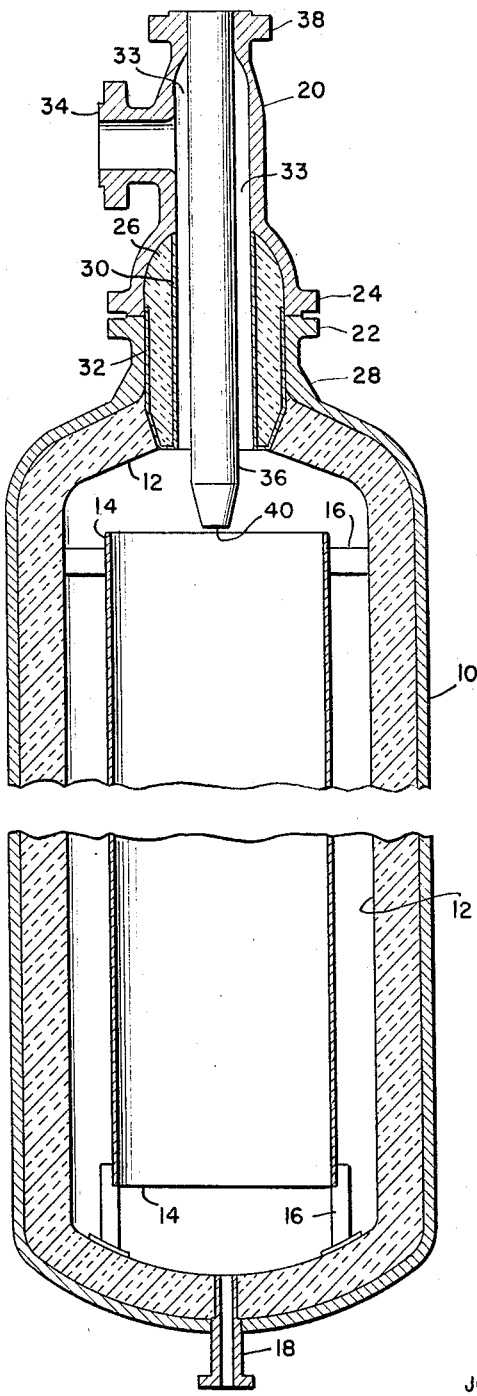

Nov. 29, 1966     J. W. PAYNE ET AL     3,288,875
HYDRODEALKYLATION OF ALKYLAROMATIC HYDROCARBONS

Filed June 27, 1963     2 Sheets-Sheet 1

INVENTORS
JOHN W. PAYNE
EDWARD J. MOLL, JR.
BY
*James F. Snowden*
ATTORNEY

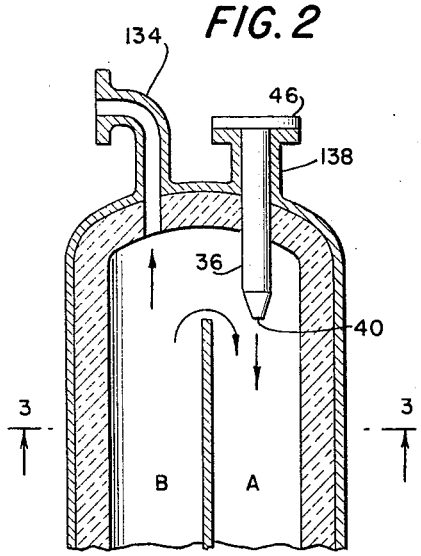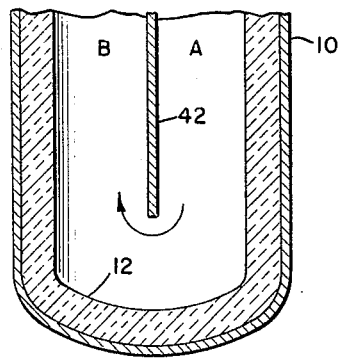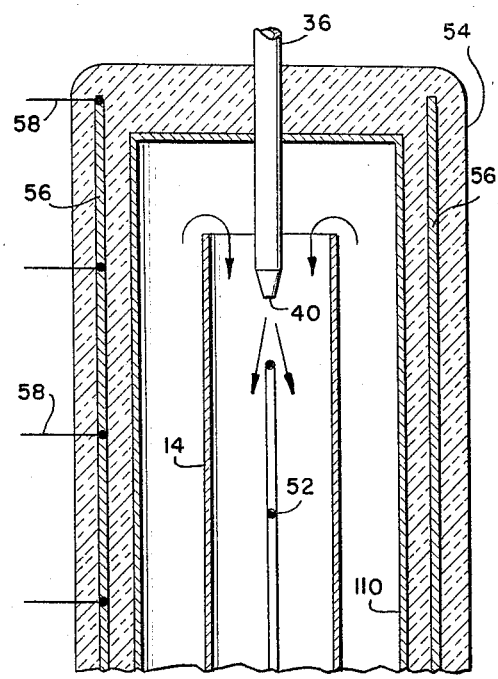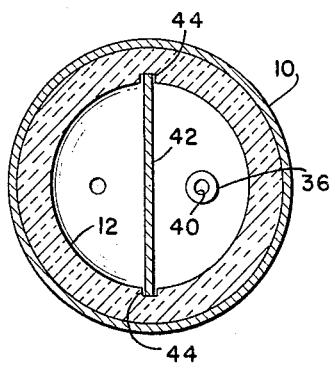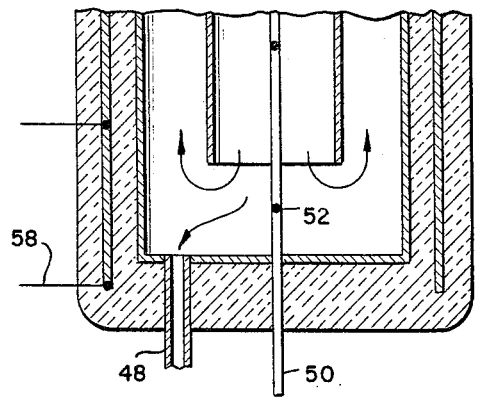

3,288,875
HYDRODEALKYLATION OF ALKYLAROMATIC HYDROCARBONS
John W. Payne, Woodbury, and Edward J. Moll, Jr., Pitman, N.J., assignors to Mobil Oil Corporation, a corporation of New York
Filed June 27, 1963, Ser. No. 291,100
9 Claims. (Cl. 260—672)

The present invention relates to an improved method for carrying out chemical reactions of a continuous nature in the vapor or gaseous phase under substantially uniform conditions resulting from thorough, rapid mixing and circulation of the charge and the reaction mixture; it is particularly recommended for the thermal dealkylation of alkylaromatic compounds.

Jets of fluids have long been employed for aspirating and transporting other fluids and also in overcoming substantial pressure differences. For example, steam ejectors are employed to maintain moderately high vacuums on condensers in steam plants, etc. by withdrawing or aspirating a liquid condensate and any uncondensed gases against atmospheric pressure. While such aspirating jet devices have proven very useful by reason of their low cost, simplicity and trouble-free operation, it is well recognized that their mechanical efficiency is quite low—usually well below 10 percent.

A variety of devices have been proposed for the intimate mixing of gaseous reactants inside reaction vessels. Fans and other mechanical impellers were employed in a number of these, and it is apparent that much of the prior art equipment is not suitable for exposure to the high temperatures which are encountered in many processes. In addition, it will be appreciated that many of these earlier devices, especially those having internal moving parts, must be shut down at regular intervals for servicing, repair or replacement.

The process of this invention has especial utility in the high temperature, exothermic dealkylation of alkylaromatic hydrocarbons by reason of the improved control of reaction temperatures. It is now possible to carry out these reactions without the formation of coke and in some cases, using more difficult feed stocks than were heretofore considered suitable. For example, in the production of naphthalene from its precursors, feed stocks with end boiling points above 525° F. and containing substantial amounts of nonaromatic normally liquid hydrocarbons (paraffins, naphthenes, and olefins) have been avoided because satisfactorily high yields could not be obtained without excessive coking. Cracking of the nonaromatic hydrocarbons and hydrogenation of the cracked fragments released a considerably greater amount of heat in an already highly exothermic reaction. Even in the production of benzene from toluene and hydrogen, the overall heat release amounts to about 22500 B.t.u. per mol of toluene converted, which is sufficient in theory to raise the reaction temperature under stoichiometric conditions about 360° F.

A heat level of at least about 1100° F. (above about 1200° in producing naphthalene) is desired to provide a reasonably fast reaction rate, and temperatures higher than 1200° are preferred. However, temperatures above about 1400° F. are unacceptable as the product begins to crack and hydrogenation of the fragments releases additional large quantities of heat that may easily result in runaway temperatures along with the rapid and undesirable deposition of coke in the equipment. To avoid this, it has been found desirable in the operation of conventional adiabatic reactors with straight through flow to employ large excesses of hydrogen, for example a 700 percent stoichiometric excess, in a refinery gas containing an approximately equal volume of methane and other light hydrocarbons in the gaseous charge to prevent coke formation and serve as a heat reservoir for moderating the temperature rise. With such feed mixtures the temperature rise for a high toluene conversion may still amount to 100° F. or more. Even with this dilution of the feed, runaway conditions and coking may occasionally occur as it is very easy to preheat the feed a little too much and thus raise the maximum reaction temperature above 1400° F. Also the use of large excesses of hydrogen and diluent gases increases the compression and preheating costs considerably while slowing the reaction rates by the dilution of the reactants.

The temperature control of the instant process enables one to avoid the catastrophic corrosion known as "metal dusting" which has been observed in a number of stainless steels during the hydrodealkylation of some charge stocks at temperatures above 1300° F.

An object of the invention is to provide better control of reaction temperatures and reaction rates in gaseous phase reactions.

Another object of the invention is to prevent excessive reaction temperatures in exothermic gaseous phase reactions.

A further object of the invention is to provide more uniform temperatures and reaction rates in gaseous phase reactions throughout the entire reaction zone.

Still another object of the invention is to provide a method for dealkylating alkylnaphthalenes without substantial formation of coke.

Yet another object of the invention is to minimize the preheating of reactants outside of the reaction vessel.

A still further object of the invention is to minimize the need for highly heat-resistant equipment in a high temperature process for the conversion of gaseous materials.

Another object of the invention is to increase the effective residence time within the reaction zone by substantially instantaneously heating a charge therein from a temperature substantially below a feasible reaction temperature to an average reaction temperature suitable for commercial purposes.

Still another object of the invention is to provide an adiabatic process for the exothermic reaction of gaseous materials in which substantially isothermal conditions are attained.

Other objects and advantages in the invention will be apparent to those skilled in the art upon consideration of the detailed disclosure which follows.

The above and other benefits of the invention are obtained by the continuous process described herein which involves preheating a charge comprising hydrogen and a normally liquid hydrocarbon feed stock containing a substantial amount of naphthalene precursor material and more than about 10% by weight of non-aromatic hydrocarbons and having an end boiling point substantially above 525° F. in which the quantity of hydrogen amounts to between about 8400 and 21,000 standard cubic feet per barrel of said liquid feed stock, injecting said preheated charge in gaseous form into a closed reaction vessel as a jet having an initial velocity between about 100 and 850 feet per second to induce rapid and thorough mixing of the reaction mixture in said vessel and maintain the reaction temperatures throughout said vessel substantially constant within 20° F. of a preselected hydrodealkylation reaction temperature but not below about 1200° F. and not above about 1400° F., maintaining said vessel under a substantially constant reaction pressure of between about 250 and 800 p.s.i.g., and withdrawing said reaction mixture from said vessel as the dealkylation product at a rate corresponding to the rate of introducing said charge therein. Other aspects of the invention encompass injecting gaseous feed in a minor proportion through a nozzle into a major proportion of a recirculated gaseous reaction mixture moving in substantially the same direction at lower velocity through a substantially unobstructed, continuous, confined channel in a closed vessel to form an intimately mixed gaseous stream of intermediate velocity, recirculating a major portion of said mixed stream through the channel to the vicinity of the nozzle and withdrawing another portion of said mixed stream from the closed vessel as the product at a rate equivalent to the feed rate.

Other features of the invention include, inter alia, the relationship of the cross sectional areas of said mixed stream and the nozzle or orifice; the desired internal recirculation ratio of about 2 to 15 parts by volume of recirculating reaction mixture per part of fresh feed, and preferably a ratio between about 4:1 and 10:1; and adjusting the preheat or inlet temperature of the incoming feed to a level substantially below (for example, at least 70° F. below) the average temperature of the reaction.

For a better understanding of the nature and objects of this invention reference should be had to the accompanying drawings and detailed description wherein all temperatures are given as degrees Fahrenheit (° F.) partial and gage pressures as pounds per square inch (p.s.i. and p.s.i.g. respectively) and proportions in terms of weight unless otherwise indicated.

FIGS. 1, 2, and 4 are longitudinal sectional views of three embodiments of reactors which may be utilized in the process of the present invention.

FIG. 3 is a horizontal section of the device of FIG. 2 taken on the line 3—3.

Turning now to FIG. 1, the cylindrical metal shell 10 may be lined with a layer 12 of insulation of suitable thickness, refractory insulation being used when the vessel is employed for carrying out reactions at high temperature. A cylindrical baffle or liner 14 open at both ends is mounted coaxially in the reactor 10 by welding the liner to the supports 16. The bottom of the vessel is provided with a suitable pipe fitting 18 for draining and purging the vessel 10 upon occasion. This pipe connection is normally sealed by a suitable valve or blank flange plate.

At the upper end of the reactor is located a removable assembly 20 which is attached to flange 22 of the vessel by bolts and gaskets (not shown) of types suitable for service at elevated temperatures. Assembly 20 has a mating flange 24 and also contains an annular plug of insulation 26 which is shaped to fit within the flanged neck 28 of the reaction vessel. The lower end of the plug 26 engages the insulating layer 12 adjacent neck 28. For easy removability of the upper assembly, the insulating plug 26 is desirably lined both internally and externally with metal shells 30 and 32. It is generally preferred to shape the lower end for a snug fit with the insulation 12 in the upper dome of the vessel. Liner 30 forms the wall of an annular outlet passage 33 which communicates with flanged outlet fitting 34 through which the reaction products leave reactor 10.

The inlet conduit 36 extends from the flanged inlet connection 38 concentrically down the liner tube 30 and terminates in a nozzle 40 which is usually, but not necessarily, located in or adjacent the plate of the open upper end of the sleeve 14. This inlet pipe 36 may be welded into a fitting 38, or it may be removably disposed therein by a threaded connection or any other suitable means for attachment to the flanged member.

Where it is desired to alter reaction conditions or carry out different reactions in vessel 10, it may be necessary or desirable to change the diameter of nozzle 40 for optimum results. This can be accomplished in several different ways. The inlet pipe 36 may be constructed with a removable nozzle fitting at its end instead of the fixed nozzle shown, or the inlet conduit 36 may be replaced by a conduit having a smaller fixed nozzle, or the entire top assembly 20 may be replaced by one having a nozzle of the desired diameter. The ready removability of the nozzle renders it readily accessible for such cleaning, repair, or replacement as may be required in continuous operations under very severe reaction conditions.

It is also contemplated that the baffle 14 may be a venturi tube, in which case the nozzle 40 is desirably located slightly upstream of the throat of the venturi.

To illustrate suitable equipment for a process for the dealkylation of toluene in which the total charge is about 50,000 lbs. per hour, the reactor may have a length of 22 feet between tangents, an effective internal diameter of 4.5 feet inside of the insulating liner 12, a baffle or partition 14 with an inside diameter of 3.2 feet and length of 21 feet and an inlet conduit 36 of 8 inches external diameter terminating in a 3-inch iron pipe size (I.P.S.) nipple as the nozzle 40. The internal metallic parts as well as the external connections of this reactor are exposed to high temperatures and therefore should be constructed of stainless steel or other suitable heat resistant alloys. However some parts, such as the baffle 14, may be of relatively thin construction as they are not subjected to any high pressure differentials or structural loads.

The operation of this device may be described in relation to the dealkylation of toluene in the vapor phase with a charge gas at a total charging rate of 3164 mols (50,820 lbs. per hour) which includes 245.5 mols of toluene, 27.4 of benzene, 1,460 mols of hydrogen and 1425 of methane, plus insignificant quantities of other hydrocarbons. The charge gas consists of a recycled portion of the product gases and fresh hydrogen-rich gas. This gaseous feed enters inlet pipe 36 at a pressure of 630 p.s.i.g. after it has been preheated to 1225° F. in a furnace (not shown).

The jet of feed is discharged downwardly from the nozzle at a velocity of approximately 710 feet per second, and the pressure drop across the nozzle amounts to about 27 p.s.i. The high velocity jet of gaseous feed quickly mixes with the other gaseous material within the tubular baffle 14 by initially establishing and thereafter maintaining a turbulent flow of gases down through the central tube on a front extending across the full width of the tube. Once inaugurated this flow continues downward out through the bottom end of baffle 14 and then up the annular space between the cylindrical baffle and the insulating liner 12. Upon reaching the top of the reactor, about $\frac{1}{10}$ of the gaseous mixture leaves through the small annular passage and fitting 34 as the benzene-rich product at the same rate as the feed is introduced. The remaining circulating gases pass again down the interior of tube 14 in a volume approximating 9 times that of the injected feed. The high velocity jet of gaseous feed raises the lower velocity of the recirculated stream to the intermediate velocity of about 35.5 feet per second, and a similar velocity is maintained in the annular zone outside of the baffle 14 inasmuch as both the inner and outer passages have approximately the same cross sectional areas of some 7½ square feet, and the pressure drop is quite low through these broad chambers with their smooth walls and minimum of obstructions. The velocity of the reaction mixture does decrease somewhat in the region upstream of the nozzle between the annular product outlet and the nozzle as a result of withdrawal of the reaction product, and the decrease is proportionate thereto.

With this high recirculation rate in turbulent flow, the fresh gaseous reactants issuing from orifice 40 quickly rise in temperature about 100° F. or more within a matter of a few feet travel due chiefly to the heat supplied by the large volume of hot recirculating gases and to a lesser extent as a result of the heat generated by the reaction proceeding in the fresh charge. For all practical purposes, this flash heating of the freshly injected charge may be considered to be substantially instantaneous.

The mixing action of the jet of reactants is so efficient that the overall range of temperatures throughout the reactor is within about plus and minus 7 degrees of the 1350° F. average reaction temperature except for the zone extending for a short distance in front of nozzle 40. With the exception of the pressure drop in the nozzle per se, the pressure drop in the passage of gases through the recirculation zone or path in the reactor is small. For instance, in this particular example the maximum static pressure differential throughout the recirculation path is only about 0.25 p.s.i. and it is seldom, if ever, expected to exceed 1.0 p.s.i. in any commercial operations.

In another modification of the same process with the same charge supplied at the same rate, the nozzle 40 is replaced by a 6-inch pipe nipple and the reactants are injected therethrough at a nozzle velocity of about 145 feet per second and a pressure drop of only about 3 p.s.i. This slower jet induces considerably less recycling of the reaction mixture and the net recirculation ratio in a vessel of the dimensions given is only slightly above 1:1, that is, somewhat more than one volume of recirculated reaction mixture per volume of feed injected. The temperature range under these circumstances is within about plus and minus 30° of the selected temperature level. These represent more or less minimum conditions for obtaining some of the benefits of the present invention by narrowing the range of temperatures within the reactor by more than half except for the first few feet of the jet issuing from the feed nozzle. The maximum feasible recirculation rate for sizable commercial operations is considered to be about 15:1 as considerably higher recirculation rates require excessive amounts of power in providing the necessary nozzle velocities. In general, recirculation ratios between 4:1 and 10:1 are recommended.

In still another modification the internal circulation system of FIG. 1 is used at a distinctly lower reaction temperature averaging 1230° F. with a total reaction pressure of 575 p.s.i.g., a contact time of 68 seconds, and a net internal recirculation ratio of 7:1 in dealkylating toluene to form benzene. A charge inlet temperature of only 1130° is required in charging 5035 standard cubic feet (s.c.f.) of hydrogen (measured at 60° F. and standard atmospheric pressure) per barrel (42 gal.) of toluene in the form of a gas of 50 mol. percent hydrogen purity. The pressure immediately upstream of the nozzle orifice is 605 p.s.i.g. and the hydrogen partial pressure there is 286 p.s.i. Hydrogen consumption in the reaction is 1005 s.c.f./b. of toluene and the conversion amounts to about 75% by volume based on toluene disappearance.

FIGS. 2 and 3 show another modification of the invention in which the reactor is divided into two similar chambers of zones A and B by an internal baffle 42 which passes through the axis of the vessel and is secured to the wall of the vessel in any suitable manner. For example, baffle 42 may be mounted in longitudinal slots 44 in the insulation as in FIG. 3. A tight fit is not necessary between the wall and baffle because there is no appreciable pressure differential between the zones A and B that would tend to set up eddies or an undesirable cross flow of gases around the sides of the baffle.

In the operation of the reactor in FIGURE 2, the reactant or reactants are injected at high velocity through the removable inlet pipe 36 provided with a flange 46 by which it is secured to the inlet connection 138 and a reactant supply pipe (not shown) by the customary bolts and using conventional gaskets or other suitable sealing means to prevent gaseous material from escaping. The jet issuing from nozzle 40 is directed downwardly, preferably along a longitudinal line as far from the walls surrounding zone A as possible, into a mass of the recirculating gaseous reaction mixture that has flowed over the top of the central baffle 42. The recirculating gas stream is moving much slower than the high velocity jet from the nozzle and the velocity of the joint stream is increased by the kinetic energy of the entering gases to an intermediate value above the velocity of the recirculating stream entering zone A but usually far below the velocity of the jet. The two gas streams quickly become thoroughly mixed and, as indicated in connection with FIGURE 1, this may rapidly increase the temperature of the preheated charge gases by 100 or 150° in the case of the hydrodealkylation of an alkyl aromatic hydrocarbon.

The reaction mixture continues down through zone A and then enters zone B by passing under the lower end of baffle 42 and rising upward through zone B to the top where a minor portion of it is withdrawn through the outlet angle fitting 134 at the same rate as the feed is being introduced through pipe 36. The desired product is later separated from the gaseous mixture issuing from the outlet connection. However, the major portion, that is more than half, of the reaction mixture in zone B passes freely over the upper end of baffle 42 and is recycled through zone A.

As in the case of the reactor in FIGURE 1, there is only a small loss in pressure in circulating the material around the reactor except for the conversion of static pressure into velocity head in nozzle 40. In order to maintain the minimum resistance to gas flow around the reactor, it will be appreciated that the distances of the top and bottom of baffle 42 from the ends of the insulating liner 12 at the top and bottom of the vessel are desirably at least equal to and preferably slightly greater than the radius of this cylindrical reactor. Also the reactor may be maintained at any selected pressure by maintaining that pressure on the outlet 134 with conventional equipment, such as a pressure regulator, while compressing the charge entering pipe 36 to a pressure from about 2 to 50 lbs. higher than the reactor pressure in order to provide the necessary velocity of the jet of about 100 to 850 feet per second.

The hydraulic radii of zones A and B are equal, whereas the annular zone in the reactor of FIG. 1 has a distinctly smaller hydraulic radius than the central zone within baffle or liner 14. Accordingly, at circulating stream velocities sufficient to introduce a sizable wall effect or pressure drop due to the friction of the gas stream on the walls of the passages or zones, the reactor of FIG. 2 is thought to be somewhat more efficient in respect to presenting less resistance to the gases flowing therethrough.

FIG. 4 depicts an embodiment of the reactor particularly designed for comparing adiabatic operations with and without internal recirculation. The cylindrical shell 110 of the reactor is closed at both ends and a cylindrical baffle or partition 14 is coaxially mounted therein on spiders (not shown) or other suitable spacing devices. The inlet conduit 36 terminating in a nozzle 40 aligned for axial flow projects through the center of one end wall of the reactor and an outlet connection 48 is provided at the other end for the removal of the reaction products. A thermowell 50 carrying a series of spaced thermocouples 52 for the measurement of the temperature of the reacting gases in various locations extends through the center of the bottom wall and along the axis of the shell 110 for the greater part of its length.

This reactor is insulated externally by a layer of insulation 54 in which is embedded an electrical heating coil 56 extending the full length of the reaction vessel 110 and tapped at various locations along its length with the leads 58. When truly adiabatic operation is desired, the operator adjusts the heating current to the several sections of coil 56 to maintain the same temperatures there as at adjacent levels within the reactor. Under these conditions there is no appreciable flow of heat through wall 110 of the reactor at any point along its length.

The operation of this modification of the reactor is the same as those described hereinbefore except that the reaction products are withdrawn through line 48 at the opposite end of the reactor from the feed nozzle.

In carrying out the examples listed in Table I, a reactor is constructed substantially as shown in FIG. 4 of 3-inch I.P.S. stainless steel pipe with an internal length of 6 feet. The orifice 40 is 0.080 inch in diameter and the partition 14 is a tube 5 feet 8 inches long of 2-inch inside diameter and $\frac{1}{16}$ inch wall thickness. This nozzle and tubular baffle 14 are removed in comparative Example A hereinafter in order to introduce the reactants at low velocity in the usual manner and to provide straight through flow without internal recirculation within the reactor.

A commercial toluene (nitration grade) is dealkylated by heating with an inlet gas containing essentially hydrogen and methane under the conditions set forth in Table I for comparative Example A and Examples 1–5. All of these examples are run under adiabatic conditions with the reactants preheated to a temperature of 1250° F. and without using a catalyst. The pressure drops in passing through the feed nozzle in the processes of Examples 1 to 5 vary somewhat but are of the order of 10 p.s.i. and are held constant during each run.

TABLE I
*Toluene dealkylation*

| Example | A | 1 | 2 | 3 | 4 | 5 |
|---|---|---|---|---|---|---|
| Operating Conditions: | | | | | | |
| Average Temperature, °F | 1,324 | 1,323 | 1,346 | 1,350 | 1,326 | 1,353 |
| Peak Reactor Temp., °F | 1,355 | 1,330 | 1,359 | 1,358 | 1,335 | 1,355 |
| Overall Δ Temp. Obs., °F | 70–80 | 90–100 | 70–80 | 90–100 | 60–70 | 100–110 |
| Overall Δ Temp. Calc., °F | 78 | 78 | 89 | 94 | 66 | 115 |
| Δ Temp. in Reactor, °F | 70–80 | 11 | 19 | 17 | 15 | 1 4 |
| Pressure, p.s.i.g | 600 | 600 | 600 | 600 | 600 | 600 |
| Nozzle Velocity, ft./sec.[2] | | 459 | 465 | 323 | 485 | 342 |
| Velocity in Central Tube, ft./sec[2] | 0.31 | 15.6 | 16.7 | 9.2 | 17.9 | 12.4 |
| Net Recirculation Ratio [2] | 0 | 17.5 | 18.5 | 14 | 19 | 19 |
| Contact Time, sec | 15.6 | 15.0 | 14.8 | 21.0 | 14.1 | 20.4 |
| Liquid Space Velocity, v./v./hr | 0.95 | 1.10 | 1.10 | 0.78 | 0.91 | 1.15 |
| $H_2$ Charge, s.c.f./b. feed | 8,690 | 8,300 | 8,180 | 8,300 | 10,820 | 5,290 |
| $H_2$: Toluene Mol Ratio (Inlet) | 6.9 | 6.6 | 6.5 | 6.6 | 8.6 | 4.2 |
| Mol Percent $H_2$ in Inlet Gas | 56.3 | 60.0 | 60.0 | 58.0 | 60.4 | 58.6 |
| $H_2$ Consumption, s.c.f./b | 911 | 806 | 899 | 995 | 813 | 911 |
| Product Yields: | | | | | | |
| $C_{1-3}$ Hydrocarbons, wt. percent | 11.8 | 10.8 | 12.4 | 13.8 | 11.1 | 12.6 |
| $C_{6+}$ Hydrocarbons, vol. percent | 88.9 | 89.8 | 88.1 | 86.8 | 89.6 | 87.7 |
| Component Yields, percent vol.: | | | | | | |
| Benzene | 52.0 | 51.5 | 59.5 | 64.8 | 53.1 | 58.5 |
| Toluene | 36.4 | 37.6 | 27.9 | 20.7 | 35.8 | 27.1 |
| $C_8$ Alkyl Benzene | | 0.2 | 0.2 | 0.2 | 0.2 | 0.2 |
| Biphenyl | 0.5 | 0.4 | 0.4 | 1.0 | 0.4 | 1.4 |
| Methyl Biphenyl | | 0.1 | 0.1 | 0.2 | 0.1 | 0.4 |
| Conversion of Toluene, percent vol.[3] | 63.6 | 62.4 | 72.1 | 79.3 | 64.2 | 72.8 |
| Conversion to Benzene, Percent vol.[4] | 62.3 | 61.7 | 71.3 | 77.6 | 63.6 | 70.1 |
| Selectivity for Benzene, percent vol.[5] | 98.0 | 98.9 | 98.9 | 97.9 | 99.1 | 96.3 |
| Aromatic Ring Balance, mol percent[6] | 98.4 | 99.7 | 99.8 | 99.8 | 99.8 | 98.8 |

[1] Employed different and more precise temperature measuring technique.
[2] Volumes of reaction mixture recirculated per volume of freshly injected charge. Approximate values calculated from temperatures.
[3] Calculated by difference between charge and yield.
[4] Actual Benzene Yield/Maximum Benzene Yield ×100.
[5] Mols Benzene Produced/Mols of Toluene Converted ×100.
[6] Mol percent of aromatics in product based on aromatics charged.

It will be noted that the observed temperature range inside the reactor is 70 to 80° F. in comparative Example A. In sharp contrast with this, a temperature range of only 11° is encountered under similar reaction conditions in Example 1 except for using the internal recirculation technique. The products and yields are very similar; but with substantially the same average reaction temperature, the maximum temperature in the reactor in which the reaction mixture is circulated internally is only 1330° F., or 25° lower than in the case of straight through flow.

In Example 2 the maximum temperature in the reactor is held substantially equal to that of Example A but the average reaction temperature is approximately 20° higher than in the comparative example, and as a consequence, the yield of benzene is 71.3% by volume rather than 62.3%.

Example 3 sets forth optimum conditions, including a somewhat longer contact time, which bring the conversion to benzene up to 77.6%, and it will be noted here that the average reaction temperature is about 25° higher than in comparative Example A although the peak temperatures are substantially the same.

Example 4 is generally similar to Example 1 except for a higher hydrogen:toluene mol ratio. Again a substantial reduction in the maximum reaction temperature is observed when the average reaction temperature is maintained approximately the same as in comparative Example A.

Example 5 indicates that the reaction may be carried out successfully at low hydrogen:toluene mol ratios when internal circulation is employed. No coke formation is encountered in this and the other internal recycle examples in the table. Here the over-all temperature rise due to the reaction, both observed and calculated, is the highest in this group of examples, but the temperature differential at a number of locations in the circulating reaction mixture is only 4° F.

A striking improvement in temperature control is also clearly apparent when the 11–19° temperature ranges in the internal recirculation Examples 1 to 4 inclusive are compared with the variation of more than 70° in comparative Example A.

While undiluted toluene is used in the above examples to simplify the problems of analysis and provide more readily comparative data, the process of this invention may be employed in thermally hydrodealkylating other charging stocks which contain alkylated aromatic hydrocarbons such as toluene, xylenes, ethylbenzene, propylbenzene, methylethylbenzene, diethylbenzene and the like. The feedstock may also contain the indanes such as 1-methylindane; 2-methylindane; 4-methylindane, 5-methylindane; 4,5,6-trimethylindane, 1,1-dimethylindane; 1,2-dimethylindane; 1,2,3-trimethylindane and 1,2,3,4,5,6,7-heptamethylindane. The aromatic hydrocarbon fraction may also contain alkylnaphthalenes and compounds such as alkyltetralins. Unalkylated aromatic materials such as benzene, indane, tetralin, and naphthalene may also be present. Olefins, naphthenes and paraffins may also be contained in these fractions.

For instance, economical feeds for benzene production are reformates boiling above 200° F. with atmospheric end boiling points up to about 400° by the A.S.T.M. procedure, these charge stocks are obtained by catalytically reforming naphthas in the C₆–250° F. boiling range. The reforming operation also produces an ample net yield of a desirable hydrogen-rich gas which may be used as a reactant in the dealkylation step. If naphthalene is also desired as a product, the reformate used as feed for that purpose should have an end point well in excess of 400° F. When it is desired to produce both benzene and naphthalene, mixtures of the two reformate charging stocks may be used. It is sometimes desirable, although not necessary, to concentrate the aromatic hydrocarbons in a feed of this type by subjecting it to conventional extraction processes and then employ the resulting aromatic hydrocarbon fraction as the liquid feedstock.

For maximum yields of naphthalene the feedstock is desirably a 400° F.+ reformate and such may be obtained by reforming kerosines boiling in the 380–650° F. range. Preferred dealkylation feeds are reformates with initial boiling points of about 400–420° and end points of about 500–550°, and these are desirably obtained by reforming 400–475° F. kerosines.

In addition to the ranges of reaction temperatures stated earlier, the other reaction conditions should be kept within certain limits for good results. The hydrogen in the gaseous portion of the charge should amount to at least 4000 s.c.f./b. of normally liquid hydrocarbons in the feed. This hydrogen rate is suitable for the production of either benzene or naphthalene in general, and charging rates above 12,500 s.c.f./b. are usually not desirable except as indicated hereinafter. Where it is desired to operate at relatively low reaction temperatures, the hydrogen rate is preferably between about 4,000 and 8,000 s.c.f./b. The hydrogen content of the normally gaseous portion of the charge may be at least 20 mol percent and preferably between about 40 and 85 mol percent. The total reaction pressure is also significant and should be maintained between about 250 and 800 p.s.i.g. (preferably 350–700) with an inlet hydrogen partial pressure of about 130 to 785 p.s.i., (preferably 250–550).

In view of the exothermicity of such reactions, the feed needs only to be preheated to a temperature in the range of about 1,100 to 1,300° F. which is at least about 70° below the average reaction temperature. The residence time may range from about 2 to 80 or more seconds.

As indicated earlier, it has not proven commercially feasible to produce naphthalene from certain difficult feed stocks with end points above 525° F. that contain more than 10% by weight of nonaromatic normally liquid hydrocarbons, and especially those with more than 15%, because of the excessive formation of coke. However, in concurrently filed application Ser. No. 290,942 of Edward J. Moll, Jr., entitled "Thermal Hydrodealkylation of Naphthalene Precursors," it is disclosed that coking may be avoided in thermal hydrodealkylation reactions with such feed stocks by a combination of a high hydrogen charging rate and extremely close control of reaction temperatures. From about 8,400 to 21,000 s.c.f. of hydrogen (preferably about 10,500 to 17,500 s.c.f.) should be charged per barrel of normally liquid hydrocarbons in the feed. The reaction temperatures should be held within about 20° F. of the preselected figure and also not below 1,200° nor above 1,400°, and a minimum of 1,250° is more desirable.

The present invention readily permits maintaining such uniformity of temperatures throughout the reactor, and Examples 6 and 7 in Table II illustrate the noncatalytic thermal hydrodealkylation of a feed stock of the aforesaid difficult type with a boiling range of 438–623° F. The feed here is preheated to 1150° and introduced into the equipment employed in Examples 1–5. As the charge issues from the nozzle, it mixes with the recirculating reaction mixture so quickly that its temperature is raised to within 10° F. of the stated average reaction temperature within a small fraction of a second.

TABLE II

Naphthalene production

| | Charge | Example 6 | Example 7 |
|---|---|---|---|
| Operating Conditions: | | | |
| Charge Inlet Temp., ° F | | 1,150 | 1,185 |
| Minimum Reactor Temp., ° F | | 1,326 | 1,348 |
| Maximum Reactor Temp., ° F | | 1,338 | 1,358 |
| Average Reactor Temp., ° F | | 1,331 | 1,351 |
| Pressure, p.s.i.g. | | 600 | 600 |
| Nozzle Velocity, ft./sec.¹ | | 308 | 300 |
| Velocity in Central Tube, ft./sec.¹ | | 12.2 | 11.7 |
| Net Recirculation Ratio ¹ | | 17.0 | 15.8 |
| Residence Time, sec.² | | | 18.2 |
| Fresh H₂ Input Rate, s.c.f./b | | 6,333 | 6,466 |
| Gas Recycle Rate, s.c.f./b | | 23,000 | 22,210 |
| Mol Percent in Recycle Gas | | 52.0 | 52.3 |
| Product Yields, Wt. Percent of Charge: | | | |
| C₁₋₃ Hydrocarbons | | 44.7 | 45.8 |
| C₄₋₅ Hydrocarbons | | | 0.2 |
| C₆–400° F | | 7.9 | 7.7 |
| 400° F.+ Fraction | | 52.3 | 51.2 |
| H₂ Consumption, s.c.f./b | | 3,089 | 3,087 |
| Composition of 400° F.+ Fraction, Vol. Percent of Charge: | | | |
| Naphthalene | 0.2 | 23.1 | 23.9 |
| Methylnaphthalene | 3.9 | 9.2 | 6.6 |
| Other Alkylnaphthalenes | 28.5 | 4.6 | 3.8 |
| Anthracenes-Phenanthrenes | 2.5 | 2.9 | 3.8 |
| Other Aromatics | 32.2 | 6.0 | 6.8 |
| Indanes, Indenes, Tetralins, etc | 11.1 | | |
| Benzothiophenes | | 2.4 | 2.0 |
| Nonaromatic Hydrocarbons | 21.6 | | |
| Total | 100.0 | 48.2 | 46.9 |
| Conversion, mol Percent | | 93.5 | 96.0 |

¹ Approximate values calculated from temperatures.
² Uncorrected for volumetric changes during reaction.

Upon examining the apparatus at the termination of a total of 20 days of operations under Examples 6 and 7, no coke deposits are found. The value for conversion is expressed as the percent of the total number of mols of alkyl naphthalenes which are converted into naphthalene, and it includes the insignificant naphthalene content of the feed stock.

For better observation and more precise measurement of various aspects of the present invention including mixing efficiencies, recirculation ratios, energy expended in the form of pressure drops at the feed nozzle and velocities of both the jet issuing from the nozzle and the stream in the central tube 14, the examples listed in Table III, IV, and V are performed in a glass apparatus of the type shown in FIG. 4 utilizing air at atmospheric pressure and room temperature. The outer glass tube 110 used in all runs has an internal diameter of 3.29 inches and is 6 feet long inside. Three nozzles of different diameters as well as three 5.67 feet long glass inner tubes 14 of the various inside and outside diameters (hereinafter abbreviated as I.D. and O.D.) set forth in the tables hereinafter are also employed.

A Pitot tube is inserted in place of the thermo-well 50 in the center of inner tube to measure the velocity of the mixed stream at a point half way along the length of central tube 14. Outlet 48 exhausts directly into the atmosphere. The nozzle flow in standard cubic feet per minute (s.c.f./min.) and velocity (feet per second or ft./sec.) are determined by passing the air through a calibrated gas meter upstream of the nozzle and computing the nozzle velocity from flow rate and nozzle cross section, whereas the total flow and velocity of the mixed air streams in the central tube are computed by determining the velocity in conventional manner from the Pitot reading and using this and the internal cross sectional area of the vessel tube to calculate the volumetric flow therethrough.

TABLE III

*Outer tube—3.29" I.D. Central tube—1.02" I.D. and 1.08" O.D.*

| Ex. | Nozzle | | | | Central Tube | | Net Recirc. Ratio [1] |
|---|---|---|---|---|---|---|---|
| | Diam., in. | ΔPress., p.s.i. | Flow, s.c.f./min. | Velocity, ft./sec. | Velocity, ft./sec. | Flow, s.c.f./min. | |
| 8 | .0625 | 9.8 | 1.09 | 850 | 30.0 | 10.3 | 8.5 |
| 9 | .0625 | 6.0 | 0.89 | 695 | 27.0 | 9.2 | 9.3 |
| 10 | .0625 | 2.7 | 0.63 | 500 | 17.1 | 5.8 | 8.2 |
| 11 | .091 | 7.4 | 2.18 | 815 | 42.0 | 14.4 | 5.6 |
| 12 | .091 | 4.6 | 1.78 | 660 | 30.0 | 10.3 | 4.8 |
| 13 | .091 | 2.3 | 1.26 | 470 | 20.2 | 6.9 | 4.5 |
| 14 | .125 | 3.7 | 2.53 | 495 | 30.0 | 10.3 | 3.1 |
| 15 | .125 | 1.8 | 1.78 | 350 | 24.9 | 8.8 | 3.9 |
| 16 | .125 | | 1.26 | 250 | 17.0 | 5.8 | 3.6 |

[1] Volumes of air recirculated into central tube per volume of fresh air injected.

TABLE IV

*Outer tube—3.29" I.D. Central tube—1.45" I.D. and 1.64" O.D.*

| Ex. | Nozzle | | | | Central Tube | | Net Recirc. Ratio |
|---|---|---|---|---|---|---|---|
| | Diam., in. | ΔPress., p.s.i. | Flow, s.c.f./min. | Velocity, ft./sec. | Velocity, ft./sec. | Flow, s.c.f./min. | |
| 17 | .0625 | 9.3 | 1.09 | 850 | 23.5 | 16.1 | 13.8 |
| 18 | .0625 | 5.9 | 0.89 | 695 | 18.6 | 12.7 | 13.3 |
| 19 | .0625 | 2.7 | 0.63 | 500 | 12.0 | 8.2 | 12.0 |
| 20 | .091 | 7.4 | 2.18 | 815 | 30.0 | 20.5 | 8.4 |
| 21 | .091 | 4.6 | 1.78 | 660 | 24.1 | 16.6 | 8.3 |
| 22 | .091 | 2.3 | 1.26 | 470 | 16.3 | 11.2 | 7.9 |
| 23 | .125 | 3.7 | 2.53 | 495 | 24.0 | 16.4 | 5.5 |
| 24 | .125 | 1.8 | 1.78 | 350 | 16.4 | 11.2 | 5.3 |
| 25 | .125 | | 1.26 | 250 | 11.5 | 7.9 | 5.3 |

TABLE V

*Outer tube—3.29" I.D. Central tube—2.05" I.D. and 2.23" O.D.*

| Ex. | Nozzle | | | | Central Tube | | Net Recirc. Ratio |
|---|---|---|---|---|---|---|---|
| | Diam., in. | ΔPress., p.s.i. | Flow, s.c.f./min. | Velocity, ft./sec. | Velocity, ft./sec. | Flow, s.c.f./min. | |
| 26 | .0625 | 9.8 | 1.09 | 850 | 12.1 | 15.1 | 12.8 |
| 27 | .0625 | 5.9 | 0.89 | 695 | 9.9 | 12.4 | 12.9 |
| 28 | .0625 | 2.7 | 0.63 | 500 | 5.6 | 7.0 | 10.1 |
| 29 | .091 | 7.4 | 2.18 | 815 | 17.0 | 21.2 | 8.7 |
| 30 | .091 | 4.6 | 1.78 | 660 | 12.1 | 15.1 | 7.5 |
| 31 | .091 | 2.3 | 1.26 | 470 | 8.0 | 10.0 | 6.9 |
| 32 | .125 | 3.7 | 2.53 | 495 | 12.9 | 16.4 | 5.5 |
| 33 | .125 | 1.8 | 1.78 | 350 | 8.8 | 11.0 | 5.2 |
| 34 | .125 | | 1.26 | 250 | 5.6 | 7.0 | 4.6 |

From the above three tables, it is readily apparent that a high velocity air jet produces unexpectedly great mixing of the gaseous contents of an endless channel in the vessel as evidenced by setting up high and turbulent flows of about 5 to 15 volumes of recirculated air per volume of air injected. This is surprising in view of the generally low efficiency of jet injectors and ejectors, and it is attributed to the fact that the present jet in inducing circulation is not working against suction or any other significant pressure difference inasmuch as the static pressure is substantially uniform throughout the vessel. Such high recirculation and the resulting turbulence are the reasons why the range of reaction temperatures is so narrow in gaseous phase reactions employing the internal recycle principle described herein.

The ratios of the effective cross sectional areas of the circulation channel and the nozzle (orifice) are set by equipment design at preferably between about 30:1 and 600:1 for large scale operations. A substantially unobstructed channel with reasonably smooth walls in area ratio lower than that range will create excessive wall friction retarding the flow too much for a suitable nozzle velocity. In view of the slight static pressure differentials throughout the reaction zone and the difficulty in measuring them accurately, especially under high temperature conditions, this minimum ratio of about 30:1 is a convenient, practical indication of the maximum acceptable pressure drop in the circulating reaction mixture resulting from the frictional resistance of the walls of the passages in the reactor. The upper end of the range is not particularly critical but ratios higher than 600:1 do not economically utilize the production capacity of the reactor.

For any given rate of feed, at least within those area relationships, the smaller the nozzle the greater the nozzle velocity and also the greater the recirculation ratio. However, more power is consumed by larger pressure drops through the smaller nozzles. For commercial operations no advantage is seen in exceeding a nozzle velocity of about 850 feet per second. In order to maintain sufficient circulation by recirculating a volume of reaction mixture at least somewhat greater than the charge injection rate the minimum nozzle velocity should be at least about 100 feet per second for commercial equipment in general.

Inasmuch as no heat of reaction is evolved in the examples of Tables III, IV and V, it is evident that suitable internal recirculation rates according to the present invention may be energized solely by the kinetic energy in the gaseous jet emerging from the inlet nozzle.

Surprisingly, experiments with the glass apparatus of FIG. 4 indicate that the alignment and location of the nozzle are not particularly critical. No substantial differences in the flow through the device are observed when the orifice is located in the plane of the mouth or open upper end of tubular baffle 14 in comparison with locating the orifice thereabove or with extending the inlet line 36 and nozzle well down into this tube. Also, no appreciable differences in the flow are found when the inlet connection 36 is moved a considerable distance from the axis toward the wall of tube 14, while maintaining the inlet pipe 36 parallel to the axis of the tube, until the inlet line is almost in contact with the inner tube 14. Moreover, upon altering the alignment of the nozzle to direct the jet of gases at an angle to said axis, no substantial effect is noted until the jet makes an angle of about 30 degrees with that axis.

The volume of flow through the central tube in Table III is distinctly less than that of Tables IV and V for the same feed rates and nozzle velocities. This results from the "wall effect" or friction in the narrower central tube. In general, it is recommended that the inner and the annular passages within the reactor have approximately equal cross sectional areas to minimize the resistance to flow of the gases; and passages or channels of substantially equal hydraulic radii may well be employed where a pronounced friction or wall effect is encountered.

It is preferred to control the feed input either by changing the size of nozzle 40 or by changing the pressure on the inlet connection 36 by altering the output of the feed compressor or both.

The surprising mixing efficiency of the present invention is also demonstrable in glass equipment by comparing the velocity on the stream in a straight through reactor with that of an internal recycle reactor. Upon converting the equipment of FIG. 4 for straight through or "plug" flow by removing the internal baffle 14 and substituting a ¼ inch I.P.S. pipe with no nozzle in place of inlet tube 36, a puff of smoke introduced at a point 30 inches in front of the inlet travels as a small cloud with little turbulence and is timed by stop watch at a rate of 0.4 foot per second when air is being introduced from the pipe at a rate of 1.18 s.c.f./min. or velocity of 27.2 feet per second. Yet with the glass apparatus of FIG. 4 equipped with the internal tube 14 of about 1.5″ diameter used in Table IV and a nozzle of 0.0625″ diameter injecting air at the same volumetric rate, the puff of smoke travels a complete circuit through the central and annular chambers too rapidly to be measured accurately with a stop watch. Moreover, the smoke disperses throughout the body of air much faster as a result of the much more turbulent flow through the channel. The same result is obtained with the 0.125 inch nozzle.

From the above description, it is apparent that many advantages are possessed by the present invention over prior art methods. It provides far better control of a reaction due to the more uniform reaction rate resulting from the substantially uniform temperature throughout the reaction space. In the case of exothermic reactions that have a tendency for the temperature to run away with decomposition of the desired product or excessive stresses and reduction in strength of the equipment, such control is particularly important. The average reaction temperature is also controlled more easily and more precisely; and the same is true of the maximum allowable temperature. For instance, such reaction temperatures can be readily regulated by adjusting the degree of preheat of the feed in the same direction. Reactor cooling problems are also minimized, for substantially isothermal operation is attained in a simple manner without cumbersome heat exchange equipment and complex controls therefor. Moreover, it is possible to employ the exothermic reaction heat for at least partially heating the feed up to the reaction temperature almost instantaneously by simple direct heat exchange.

In at least some reactions, including the dealkylation of alkylaromatic hydrocarbons, a higher percent conversion is obtained by the instant process for a given feed rate and maximum temperature, or at that same maximum temperature one may substantially increase the feed rate without lowering the conversion. Also, it is possible for a given conversion and feed rate to lower the maximum temperature, thereby saving fuel in the preheating operation and increasing the life of the equipment. In dealkylation reactions one can reduce the quantity of excess methane and relatively expensive hydrogen employed, as there is no need for a heat reservoir in the present invention; moreover, such reduction permits increasing production somewhat at the same conversion level by increasing the throughput of alkylaromatic hydrocarbons. As indicated hereinbefore, the invention also renders the dealkylating of certain difficult high boiling feed stocks into naphthalene commercially feasible. The desirability and importance of the improved temperature control described herein is evident when it is considered that even though thermal hydrodealkylation has proved superior to catalytic hydrodealkylation, at least in the case of certain feed stocks, development of the thermal method has been seriously hampered in the past by inadequate control of reaction temperatures.

It will be appreciated that the instant process may be used for vapor phase reactions in general, especially those of an exothermic nature. For example, this method can be employed in other hydrocarbon conversions, such as gaseous hydrocarbon oxidation and also for benzene hydrogenation in the production of cyclohexane. Accordingly, the present invention should not be construed as limited to the detailed disclosure herein except as may be specified in the appended claims or required by the prior art.

We claim:

1. A continuous process for the production of naphthalene by thermal hydrodealkylation which comprises preheating a charge comprising hydrogen and a normally liquid hydrocarbon feed stock containing a substantial amount of naphthalene precursor material and more than about 10% by weight of nonaromatic hydrocarbons and having an end boiling point substantially above 525° F. in which the quantity of hydrogen amounts to between about 8400 and 21,000 standard cubic feet per barrel of said liquid feed stock, injecting said preheated charge in gaseous form into a closed reaction vessel as a jet having an initial velocity between about 100 and 850 feet per second to induce rapid and thorough mixing of the reaction mixture in said vessel and maintain the reaction temperatures throughout said vessel substantially constant within 20° F. of a preselected hydrodealkylation reaction temperature but not below about 1200° F. and not above about 1400° F., maintaining said vessel under a substantially constant reaction pressure of between about 250 and 800 p.s.i.g., and withdrawing said reaction mixture from said vessel as the dealkylation product at a rate corresponding to the rate of introducing said charge therein.

2. A process according to claim 1 in which said gaseous charge is introduced into said closed vessel at a temperature at least about 70° F. below the average reaction temperature in said channel.

3. A continuous process for the production of naphthalene by thermal hydrodealkylation which comprises preheating a charge comprising hydrogen and a normally liquid hydrocarbon feed stock containing a substantial amount of naphthalene precursor material and more than about 10% by weight of nonaromatic hydrocarbons and having an end boiling point substantially above 525° F. in which the quantity of hydrogen amounts to between about 8400 and 21,000 standard cubic feet per barrel of said liquid feed stock, injecting said preheated charge in gaseous form into a closed reaction vessel through a nozzle at a velocity between about 100 and 850 feet per second into a recirculated gaseous reaction mixture moving in substantially the same direction at lower velocity than said injected charge through a substantially unobstructed continuous confined channel in said vessel to form a mixed gaseous stream of intermediate velocity, said mixed stream having a greater proportion of said recirculated mixture than of the freshly injected charge, maintaining a substantially constant reaction pressure of between about 250 and 800 p.s.i.g. within said vessel, recirculating a major portion of said mixed stream through the channel to the vicinity of the nozzle, maintaining the temperature of said mixed stream substantially constant within about 20° F. of a preselected hydrodealkylation temperature but not below about 1200 and not above about 1400° F., and withdrawing another portion of said mixed stream from said vessel as the dealkylation product of the process at a rate corresponding to the rate of introducing said charge therein.

4. A process according to claim 3 in which the ratio of the cross sectional areas of said channel and said nozzle is at least about 30:1.

5. A process according to claim 3 in which one part by volume of said gaseous charge is injected into between about 2 and 15 parts of recirculated reaction mixture.

6. A process according to claim 3 in which one part by volume of said gaseous charge at an elevated temperature is injected into a stream at a substantially high temperature containing between about 4 and 10 parts of recirculated reaction mixture.

7. A process according to claim 3 in which said gaseous charge is introduced into said closed vessel at a temperature at least about 70° F. below the average reaction temperature in said channel.

8. A process according to claim 3 in which said mixed stream is returned to the vicinity of said nozzle through an annular passage surrounding the injected high velocity gaseous charge stream.

9. A continuous process for the production of naphthalene by thermal hydrodealkylation which comprises preheating a charge comprising hydrogen and a normally liquid hydrocarbon feed stock containing a substantial amount of naphthalene precursor material and more than about 15% by weight of nonaromatic hydrocarbons and having an end boiling point substantially above 525° F. in which the quantity of hydrogen amounts to between about 10,500 and 17,500 standard cubic feet per barrel of said liquid feed stock, injecting said preheated charge in gaseous form into a closed reaction vessel through a nozzle at a velocity between about 100 and 850 feet per second into a recirculated gaseous reaction mixture moving in substantially the same direction at lower velocity than said injected charge through a substantially unobstructed continuous confined channel in said vessel to form a mixed gaseous stream of intermediate velocity, said mixed stream having a greater proportion of said recirculated mixture than of the freshly injected charge, maintaining a substantially constant reaction pressure of between about 250 and 800 p.s.i.g. within said vessel, recirculating a major portion of said mixed stream through the channel to the vicinity of the nozzle, maintaining the temperature of said mixed stream substantially constant within about 7° F. of a preselected hydrodealkylation temperature but not below about 1250 and not above about 1400° F., and withdrawing another portion of said mixed stream from said vessel as the dealkylation product of the process at a rate corresponding to the rate of introducing said charge therein.

References Cited by the Examiner

UNITED STATES PATENTS

| | | | |
|---|---|---|---|
| 3,149,176 | 9/1964 | Glazier et al. | 260—672 |
| 3,182,094 | 5/1965 | Glazier et al. | 260—672 |
| 3,201,488 | 8/1965 | Sherk et al. | 260—672 |

DELBERT E. GANTZ, *Primary Examiner.*

PAUL M. COUGHLAN, *Examiner.*

C. R. DAVIS, *Assistant Examiner.*